R. KOHN.
STAND FOR GLASS PERCOLATORS.
APPLICATION FILED JAN. 13, 1915.
1,186,318.
Patented June 6, 1916.
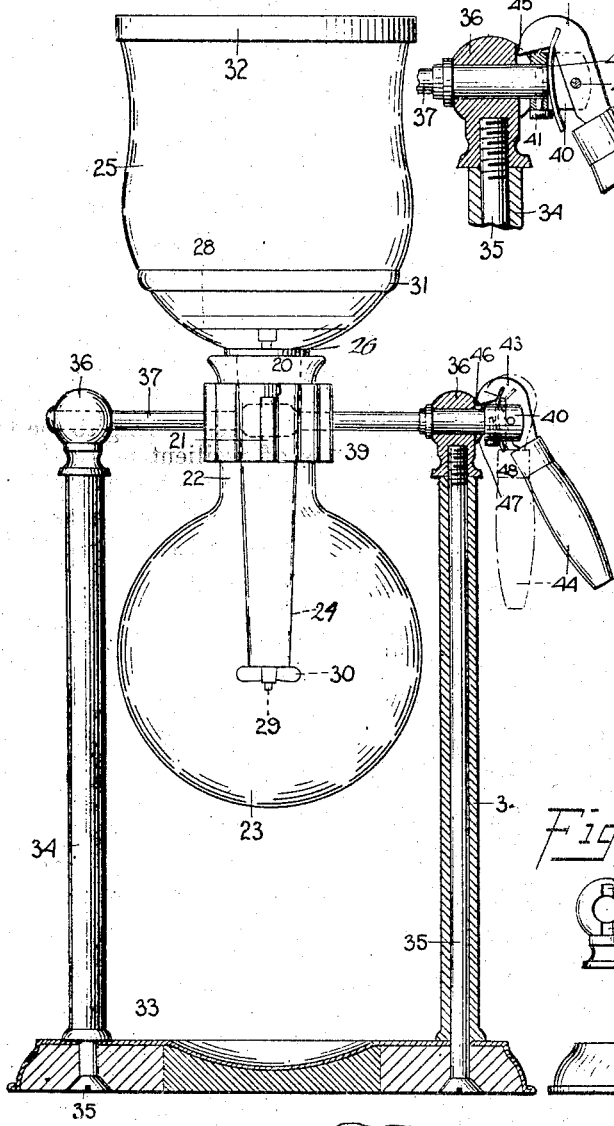
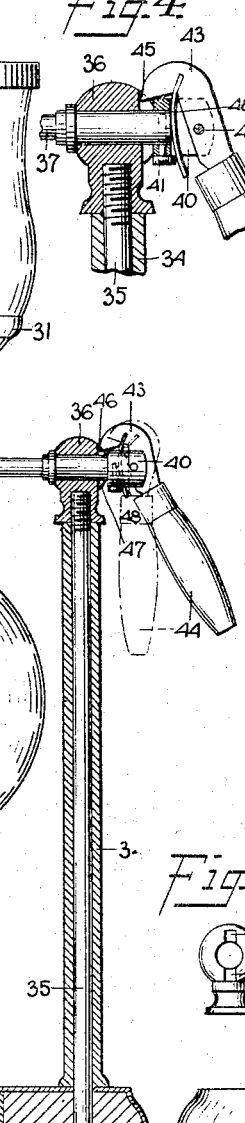
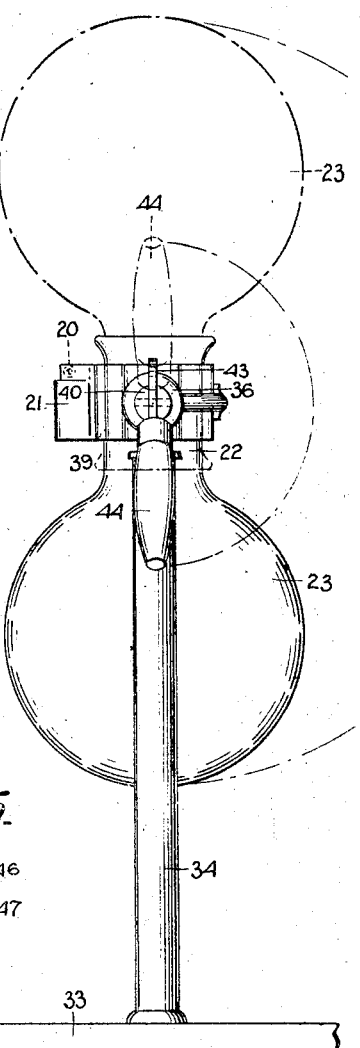
WITNESSES:
George L. Blume.
Edwin Burch.
INVENTOR
Richard Kohn
BY Munn & Co
ATTORNEY

UNITED STATES PATENT OFFICE.

RICHARD KOHN, OF NEW YORK, N. Y., ASSIGNOR TO MANHATTAN GLASS PERCOLATOR CO., OF NEW YORK, N. Y., A FIRM.

STAND FOR GLASS PERCOLATORS.

1,186,318.   Specification of Letters Patent.   Patented June 6, 1916.

Application filed January 13, 1915. Serial No. 1,955.

*To all whom it may concern:*

Be it known that I, RICHARD KOHN, a citizen of the United States, and a resident of the city of New York, borough of Brooklyn, in the county of Kings and State of New York, have invented a new and improved Stand for Glass Percolators, of which the following is a full, clear, and exact description.

This invention relates to improvements in coffee percolators or the like and more particularly to an improved stand for glass percolators or that type of percolator in which the coffee only comes in contact with glass parts, or substantially so, so that oxidation of the coffee is obviated.

The primary object of the invention is to provide an improved stand for coffee percolators of the type set forth in which improved means are provided for removably supporting a bowl or globe which constitutes the boiler of the percolator, so that the latter can be readily applied or removed, to obviate the use of cumbersome clamping devices and cork or other linings to prevent breaking of the neck of the bowl due to expansion under heat, by providing an improved clamp for this purpose.

A further object of the invention is to improve the construction of the stand to permit the bowl to be tilted after the coffee has been made, in order to pour the same and, further, to provide a guide for the use of the proper quantity of pulverized coffee for making a predetermined measure or volume of the beverage.

With the above and other objects in view, the invention resides in the peculiar combination and arrangement of parts to be hereinafter more fully described, illustrated and claimed, it being also an object to provide a device which is simple in construction, durable and efficient.

Reference is to be had to the accompanying drawings forming a part of this specification, in which similar characters of refernece indicate corresponding parts in all the views and in which—

Figure 1 is a side elevation partly in section of a preferred form of percolator stand; Fig. 2 is an end view thereof in elevation looking toward the left in Fig. 1; Fig. 3 is a horizontal sectional view of the device shown in Fig. 1 taken through the neck of the bowl above the clamp and with the base omitted; Fig. 4 is an enlarged detail sectional view of the arrangement for tipping the bowl and holding the same in upright or inverted position; and Fig. 5 is an end elevation of the upper part of one side of the stand with which the handle of the device coöperates to produce said tipping arrangement.

The clamp 39 is designed to take the neck portion 22 of a bowl or globe 23 which constitutes the boiler of the percolator and which is filled with water, preferably hot, in making the coffee. Owing to the fact that the clamp is of resilient metal and has its free ends detachably connected by means of a U-shaped clip 21 pivoted at 20, the neck of the bowl may be readily snapped into and out of the same and in so doing cause the jaws of the clamp to separate, it being understood that the clip is moved to a disengaged position to permit this. When the bowl is so supported it is designed to take the stem portion 24 of a funnel 25 which, like the bowl, is made of fireproof glass in order to avoid destruction by the heat of the flame. A rubber or other sleeve 26 fitted on the stem of the funnel will contact frictionally with the inner surface of the neck of the bowl and form a liquid-tight joint, as well as to avoid contact of the glass parts so that the stem will extend well down into the bowl the desired distance but preferably relatively near the bottom thereof.

A strainer 28 is fitted in the funnel and is held in position by a fastening device consisting of a depending rod 29 which depends axially in the stem and has a nut 30 attached to the lower end thereof to span the mouth or spout of the funnel in order to securely hold the strainer in position. The bowl of the funnel is preferably of the curvature shown and is provided with an external annular bead 31 which indicates the height of the pulverized coffee to be placed in the funnel in order to make a bowl full of the beverage, and the top of the funnel is provided with a cover 32 in order to protect the contents.

In practice the coffee is placed in the funnel and the bowl or globe is filled with hot water or such quantity poured therein as desired according to the number of cups of coffee to be made. With the funnel in position the lamp is lighted and as the water boils it will gradually ascend into the funnel and permeate the coffee contained therein. This will continue for a few minutes and the water in passing through the coffee will imbibe all of the flavor and aroma thereof and return or percolate back into the bowl. But a few minutes is required, although the strength of the coffee can be regulated by the length of time that it is subjected to the action of heat or boiled. By stirring the coffee in the funnel clogging of the strainer will be prevented and after the burner or lamp has been removed the coffee thus made will run back into the bowl and may be poured therefrom by removing the funnel.

The percolator stand is made up of a base 33 upon which spaced parallel uprights 34 are mounted as through the medium of fastening screws 35 passing through the base which is suitably weighted to prevent the device from tipping over and through the tubular uprights 34. The upper ends of the screws project beyond the upper ends of the uprights and have ball or globe shaped pivot heads 36 attached thereto. These pivot heads are formed with horizontal apertures in which a cross arm 37 is journaled near its extremities, said cross arm being bent toward one side as shown at 38 in order to provide for the attachment of a one-piece clamp 39 which is soldered or otherwise fastened thereto and which projects at right angles therefrom so that the axis of the clamp is disposed coincident with the center of the stand or base thereof. The clamp is designed to take the neck of the bowl in the usual manner, the bowl supporting the funnel and other parts for use as just explained.

Means are provided for tipping or tilting the bowl in the water to pour the contents, by turning the cross arm 37 in its pivots and holding the same in an adjusted position so that the bowl will be held either upright or inverted, and for this purpose one end of the cross arm 37 is extended beyond one of the pivot heads 36 and has secured thereto a vertically slotted enlargement 40 which is fixed to said extended end, as by means of a set pin 41. Horizontally pivoted as shown at 42 in said slotted head is a latch 43 having a handle 44 for moving the same on its pivot. This handle normally extends downwardly and the latch is provided with an engaging nose 45 designed to enter the slots 46 and 47 in the upper and lower portions of the adjacent pivot head, at different times, in order to hold the bowl in an upright or inverted position. For this purpose a normally rectilinear flat spring 48 is anchored to the latch member inwardly of said engaging nose and engages the end wall of the slot in the enlargement 40 so that in its tendency to assume a rectilinear position it will draw on the engaging end of the latch to cause the nose of the latter to engage one of the slots or notches 46 or 47. Normally, the bowl will be in an upright position and the handle 44 directed downwardly so that the ends will enter the notch 46 and hold the bowl in this position, but should it be desired to invert the bowl in order to tilt the same and pour the coffee therefrom, the handle is pressed downward and inward, so as to disengage said nose from the notch 46. By swinging the handle upwardly, the bowl will be correspondingly swung with the cross arm as the latter turns on its pivots so that the bowl may be tilted at any desired angle or held in an inverted position by engagement of the nose with the notch or slot 47 when the handle extends upwardly and disposed at an angle of 180° from the first named position.

I claim—

1. In a stand for percolators, the combination of a base, a pair of tubular uprights supported thereon, screws extending from the base through the uprights, a pair of heads threaded upon the upper ends of the screws to lock the uprights in fixed position, a cross arm journaled in said heads, the central portion of the cross arm being deflected laterally, a percolator holding clamp secured at one side to the deflected portion of the cross arm and with the center of the clamp in alinement with the axis of the cross arm, and means connected to the cross arm to control its rotation.

2. In a stand for percolators, the combination of a base, a pair of uprights secured thereto, a pair of heads at the upper ends of the uprights, a cross arm journaled on a horizontal axis in said heads, a clamp for the percolator secured rigidly to the cross arm, one of the heads having a pair of slots on one side above and below the cross arm, a latch pivoted on a transverse pivot in the end of the cross arm and having a nose adapted to enter one or the other of said slots to lock the cross arm from rotation, and a leaf spring anchored at one end in the latch and bearing on the bottom of the slot in which the latch is pivoted, whereby the latch is caused to tend to enter and remain in one of the slots, substantially as set forth.

In testimony whereof I have signed my name to this specification in the presence of two subscribing witnesses.

RICHARD KOHN.

Witnesses:
 MILLARD VEIT,
 EGON FRANK.